United States Patent [19]

Fine et al.

[11] Patent Number: 4,954,722
[45] Date of Patent: Sep. 4, 1990

[54] SCANNING SCATTERING MICROSCOPE WITH HEMISPHERICAL MIRROR AND MICROFOCUSED BEAM

[75] Inventors: Joseph Fine, Silver Spring; Denes Marton, Rockville, both of Md.

[73] Assignee: The United States of America as represented by the Secretary of Commerce, Washington, D.C.

[21] Appl. No.: 382,884

[22] Filed: Jul. 21, 1989

[51] Int. Cl.$^5$ .................. H01J 3/14; G01N 21/86; G01N 21/47

[52] U.S. Cl. .................. 250/571; 250/216; 356/446; 356/371

[58] Field of Search ............ 356/446, 371; 250/216, 250/571, 572, 560, 561, 562, 563, 201, 201.1, 201.3

[56] References Cited

U.S. PATENT DOCUMENTS

| | | | |
|---|---|---|---|
| 4,360,275 | 11/1982 | Louderback | 356/446 |
| 4,423,331 | 12/1983 | Koizumi et al. | 356/446 |
| 4,548,506 | 10/1985 | Elson | 356/446 |
| 4,659,229 | 4/1987 | Hernicz | 356/446 |
| 4,673,818 | 6/1987 | Guerra | 356/446 |
| 4,815,858 | 3/1989 | Snail | 356/446 |

FOREIGN PATENT DOCUMENTS

| | | | |
|---|---|---|---|
| 60-56208 | 4/1985 | Japan | 356/446 |
| 60-56209 | 4/1985 | Japan | 356/446 |
| 0641334 | 1/1979 | U.S.S.R. | 356/446 |
| 0654853 | 3/1979 | U.S.S.R. | 356/446 |

Primary Examiner—David C. Nelms
Assistant Examiner—Michael Messinger
Attorney, Agent, or Firm—Thomas Zack; Alvin J. Englert; William H. Wright

[57] ABSTRACT

A method and apparatus (10) for producing two-dimensional micrographs of the overall surface microtopography of a given specimen (19) by using a photodetector (22) to measure the off-specularly reflected light from a focussed light beam (50) which is projected through a hemispherical mirror (20) onto the specimen surface as the specimen surface is scanned by the focused beam of light (50). Scanning can be accomplished either by moving the specimen surface (19) as a result of moving the sample holding member (18) or by moving the focused beam of light by means of a light beam deflection device (25).

4 Claims, 1 Drawing Sheet

SCANNING SCATTERING MICROSCOPE WITH HEMISPHERICAL MIRROR AND MICROFOCUSED BEAM

TECHNICAL FIELD

The present invention relates in general to apparatus used to image surface microfeatures as a result of the measurement of off-specularly scattered light.

BACKGROUND OF THE INVENTION

Surface roughness of fine finished surfaces can be measured using the so-called total integrated scattering (TIS) method, which is based on the concept that rougher surfaces scatter more light into off-specular or non-specular directions. With this TIS method measurements of average surface roughness for an area typically 1 mm$^2$ can be obtained.

The American Society for Testing and Materials has adopted this TIS technique as a standard test method for surface roughness. Surface profiles (e.g. two-dimensional surface scans) also can presently be obtained using stylus techniques, scanning tunnelling microscopy, scanning electron microscopy (SEM), etc. Images of surface reliefs can be obtained using optical microscopy, optical interferometry, and transmission electron microscopy, etc.

The information content of off-specularly scattered light is quite different from that of other known surface profiling and imaging techniques: TIS is characterized by the r.m.s. roughness of the surface, subject to certain wavelength limitations. All other techniques referred to above provide information of the surface shape itself.

While at least one prior art patent, Kato et al., U.S. Pat. No. 4,690,565 teaches the use of a focused light beam to scan certain features on a surface under examination as well as monitoring the scattered light by collimating it through the use of a parabolic or spherical mirror and detect the output with photo sensors, this invention only collects a small fraction of the scattered light.

As a consequence, when only a fixed solid angle of the scattered light is collected as taught by Kato et al., the method becomes inherently insensitive to certain types of surface features and no quantitative results can be obtained. In addition, the Kato et al. patent does not make any provision for removing the specularly-reflected laser light beam which can subsequently be scattered by the focusing lens since it is then traveling in the opposite direction.

As a result of the deficiencies of the known prior art patents, there has existed a long standing need among those individuals involved in this area of technology for a scanning scattering microscope arrangement having a high sensitivity for detecting roughness; and, wherein the techniques employed produce quantitative results sensitive to a broad range of surface features. The provision of such a device being a stated objective of the present invention.

SUMMARY OF THE INVENTION

Briefly stated, the present invention involves both a method and apparatus in which a fine focussed light beam is scanned along the reflective surface to be investigated (hereon to be referred to as the specimen), and the non-specularly reflected light is collected by a spherical mirror and directed onto a detector. The light intensity detected at each point of the sample is used to produce a two-dimensional micrograph of the sample surface. This micrograph contains information on the surface roughness and reflectivity (including polarization, absorption, and optical constants) of the sample and can be used to construct a profile of the surface topography.

All previous TIS measurements have been used to characterize the average surface roughness of relatively large surface regions (approximately 1 mm$^2$). These types of measurements are done in a static mode using a relatively large beam of light (approximately 1 mm diameter); for a surface region illuminated by this light beam one value of surface roughness is obtained.

The concept behind the present technique is to make use of the information contained in the off-specular scattered light (TIS measurement) and to combine it with a microfocussed, scanned light beam in order to produce a two-dimensional micrograph of surface features. An enhanced sensitivity to very subtle roughness features, in height, is obtained by collecting virtually all of the off-specular scattered light while high lateral resolution of surface features results from using a scanned microfocussed light beam.

Scanning can be realized by moving either the specimen or the light beam. This approach is analogous to that of using scanning electron microscopy instead of measuring secondary electron yields. The method disclosed herein uses this concept of scanning for an entirely new application; and, it can result in a number of significant advantages over existing scanning and imaging techniques such as: very high sensitivity to surface roughness (approximately 1 nm); quantitative surface roughness capability; measurement of opaque surfaces; operation in air or in vacuum; and, easy implementation.

In addition, the invention disclosed herein may also find applications in those areas where surface roughness of otherwise very smooth surfaces varies over different areas of the same surface. Such situations arise in various cases of electronic technology, thin film technology, sputtering and etching, optical technology, etc. This invention also combined the concepts of TIS and two-dimensional surface profiling in order to produce a micrograph of the local surface topography rather than of the actual heights of the surface features. Since light scattering is related also to the reflectivity of the surface (including polarization effects), the TIS micrograph can be affected by changes in surface composition as well, and may result in a technique capable of providing both materials and magnetic contrast.

BRIEF DESCRIPTION OF THE DRAWINGS

These and other objects, advantages and novel features of the invention will become apparent from the detailed description of the best mode for carrying out the invention which follows; particularly when considered in conjunction with the accompanying drawings, wherein.

BEST MODE FOR CARRYING OUT THE INVENTION

Figure 1:
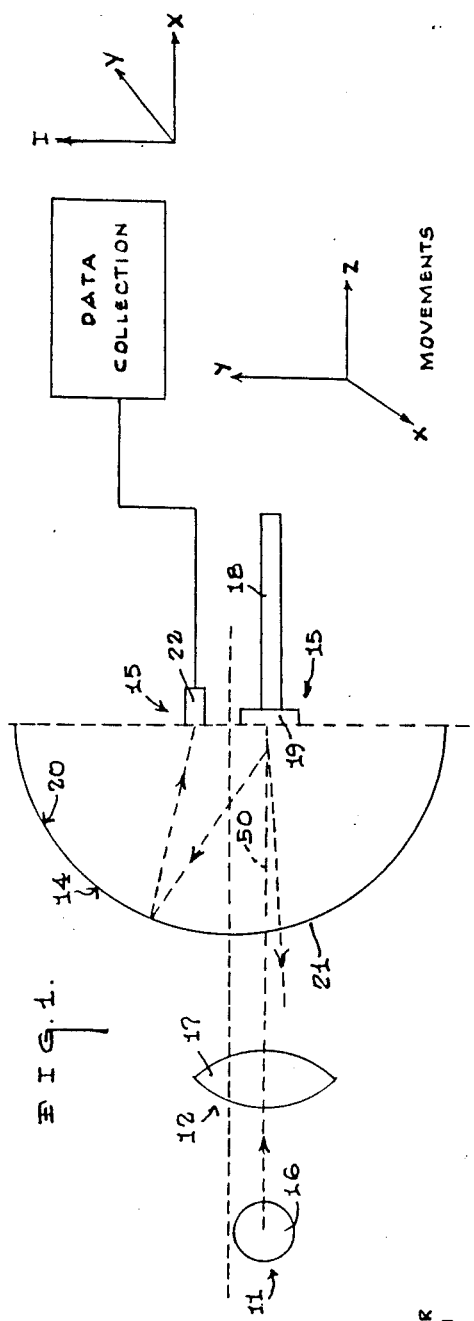
FIG. 1 is a schematic diagram of the scanning scattering microscope arrangement of this invention using sample scanning.

As can be seen by reference to the drawings and in particular to FIG. 1, the scanning scattering microscope apparatus that forms the basis of the present invention is designated generally by the reference numeral (10). The apparatus (10) comprises in general: a light source unit (11); focusing unit (12); a sample holding unit (13); a mirror unit (14); and a detector unit (15). These units will now be described in seriatim fashion.

The light source unit (11) comprises a monochromatic, parallel light beam of constant intensity (16) which passes through the focussing unit (12) to produce a focussed light beam (50); wherein, the focussing unit (12) comprises a beam expander and focussing lenses (17).

The sample holding unit (13) comprises a conventional sample holding member (18) which is movably mounted in the x, y and z directions in a well recognized manner relative to the longitudinal axis of the focussed beam of light (50) which is incident on the surface of a specimen (19) mounted on the sample holding member (18).

Figure 2:
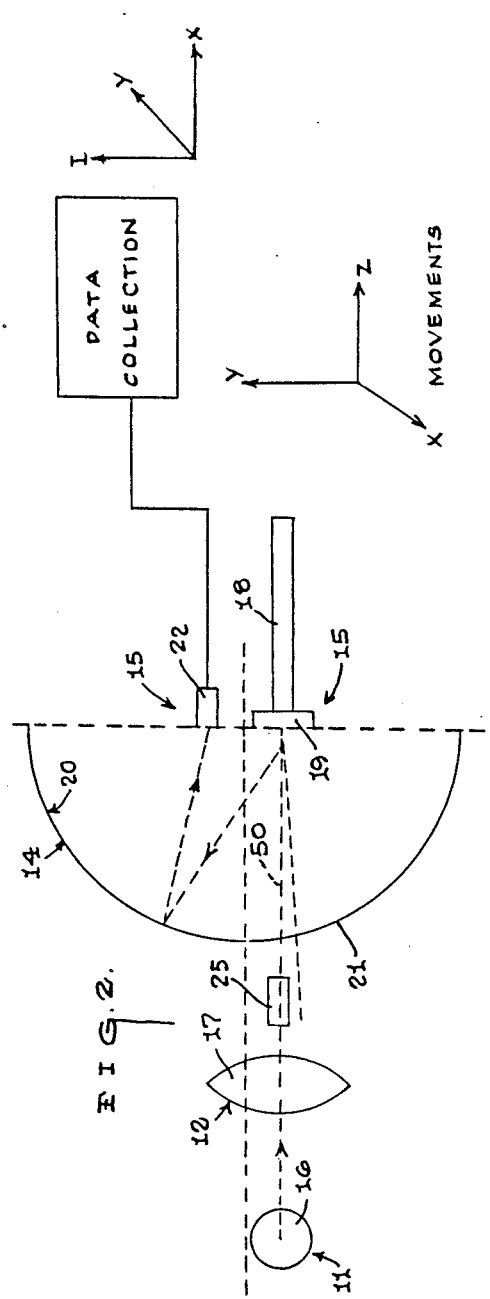
FIG. 2 is a schematic diagram of the scanning scattering microscope arrangement of this invention using light beam scanning; and, FIG. 3 is a schematic diagram of the prior art total integrated scattering (TIS) method.

Two basic means exist for scanning the light beam over the region of interest on the specimen surface: either the specimen can be moved with the light beam kept stationary or the light beam can be moved with the specimen kept stationary. Referring to FIG. 1, the sample holding member (18) can be moved along the x and y directions relative to the focussed beam of light to scan the specimen. Alternatively, referring to FIG. 2, the focussed light beam (50) can be moved by means of a light beam deflection device (25) over the surface of the stationary specimen (19) mounted on the sample holding member (18). Still referring to FIG. 1, it can be seen that the mirror unit (14) comprises an apertured hemispherical mirror (20) having an aperture hole (21) formed therein at a location that is slightly offset relative to the center of the periphery of the hemispherical mirror (20) such that the focussed light beam (50) from the light source (16) can pass through the aperture hole (21), while the light rays reflected specularly from the surface of the specimen (19) can pass in the other direction through the aperture hole (21).

In addition, the focusing lens (17) is designed and mounted in such a way that the focal point of the focussing lens is positioned in the vicinity of the center of the hemispherical mirror (20). Furthermore, optimal signal-to-background is obtained by eliminating all extraneous light from entering the apparatus.

The output signal from the photodetector member is then used to construct a micrograph of the scanned surface area in such a way that each point of the surface is characterized by three parameters: the x and y coordinates of this point and intensity I of the scattered light as detected by the photodetector member. The data collection and processing of the output of the photodetector member (22) may be accomplished by either manual or automated plotting means.

The invention disclosed provides two-dimensional micrographs with a lateral resolution limited by the wavelength ($\lambda$) of the light beam used (typically the resolution may be no better than 5 $\lambda$) and with a resolution perpendicular to the surface which may be better than 1 nm.

A version of the apparatus has been constructed using a He-Ne laser ($\lambda$-632.8 nm, unpolarised) as a light source; a beam expander (1 mm diameter to 10 mm diameter) and a lens (F=90 mm) constitute the focussing unit 2; an xyz stage equipped with micrometer screws and with computer controlled analog drives for the x and y movements was used as the specimen holder member. The hemispherical mirror had an inner radius of 2.6" and the aperture hole (diameter 5/16") was dispersed off-center by 0.3". The photodetector member was a Si device and the processing system consisted of a chopper, a lock-in amplifier, a digital voltmeter, and a computer. The spatial resolution D is determined as follows:

$$D = \frac{4\lambda F}{d} = 4.8 \ \mu m$$

where d-10 mm is the 1/e² diameter of the light beam.

The results may be quantified using the theory of light scattering in the smooth surface limit. Thus, to a first approximation, the r.m.s. surface roughness $R_q$ can be obtained as $$R_q = \frac{\lambda}{4\pi} \sqrt{I/I_o}$$

where is the wavelength of the light, I is the intensity of the off-specularly scattered light, measured as collected by detector, and $I_o$ is the intensity of the specularly reflected light.

At this juncture it should be appreciated that the apparatus (10) described herein possesses numerous advantages. One such advantage stems from collecting and detecting virtually all of the scattered light and is related to the angular dependence of the scattered light on the wavelength (lateral extent) of the surface features or roughness present on a surface. When only a fixed solid angle of the scattered light is collected, the method becomes insensitive to certain types of surface features. However, when all of the scattered light is collected over virtually all solid angles then the technique becomes sensitive to a broader range of surface features.

Another advantage which results from this method of collecting virtually all of the scattered light is that the measurement is, basically, a quantitative one. Measurements of total scattered light can be related to the r.m.s. surface roughness and quantitative results can be obtained in this manner; this however is not the case where only a fraction of the scattered light is collected.

A further advantage which this approach has over the prior art devices is that this method provides for the high-intensity, specularly-reflected, light beam to be removed from the region of measurement. This eliminates any further interaction by reflection and scattering of the incident beam with the specimen and ensures maximum signal-to-background at the detector.

Figure 3:
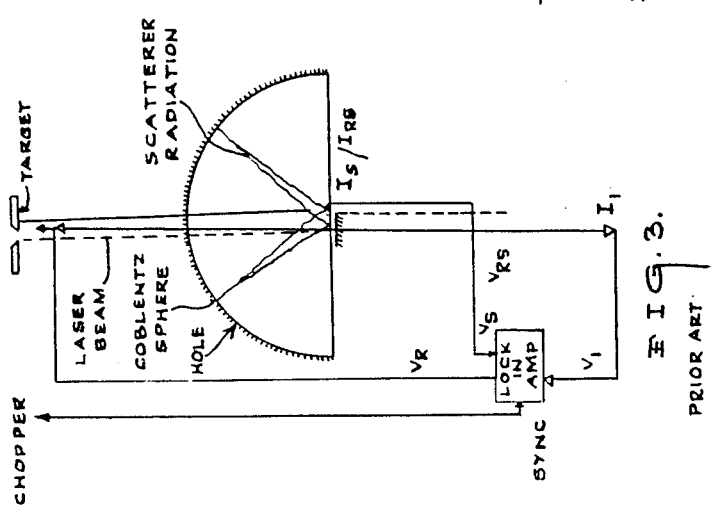

In order to gain a better appreciation of the subject matter of the present invention, the reader's attention is directed to the subject matter depicted in FIG. 3 which is a schematic diagram of the overall arrangement of the required components which constitute the standard test method for measuring the effective surface roughness of optical components by total integrated scattering ASTM STANDARDS DESIGNATION F-1048-87 which is partially reproduced herein as follows:
1. Scope 1.1 This test method covers the measurement of the effective surface roughness of an opaque reflecting surface as determined by the total integrated light scattering (TIS).

1.2 Applications:

1.2.1 This test method is particularly applicable to metal mirrors or smooth dielectrics covered with an opaque reflecting surface.

1.2.2 This test method is applicable to specimens ranging in size from 5 mm in diameter to as large as the supporting components will accommodate. The sampling area is approximately 1 mm in diameter.

1.3 Limitations—This test method is limited to specimens with optical surfaces that are flat or that are spherical with a radius of curvature greater than 10 m.

1.4 This test method determines the integrated scattering from an angle approximately 2.5° from the surface normal to an angle approximately 70° from the surface normal.

1.5 The test method is performed with a helium-neon laser operating at the wavelength 632.8 nm.

1.6 Repeated use of this test method on different areas of the specimen permits mapping of the surface TIS.

1.7 This test method is nondestructive.

1.8 The maintenance of a control chart is to monitor the stability of the measurement process is discussed in Annex A1.

3. Descriptions of Terms Specific to This Standard 3.1 microroughness, $h_{rms}$—the root mean square of the short-range deviations of a surface above and below its mean position.

3.2 surface flaws—defects such as scratches or pits which are not typical of the surface finish.

3.3 total integrated scatter, TIS—for the purposes of this test method, the radiation scattered by an opaque reflecting surface into a $2\pi$ solid angle.

4. Summary of Test Method 4.1 A beam of radiation from a helium-neon laser is made to impinge on the surface of the specimen. First, the specular reflectance is measured. Next, the power of the radiation scattered by the specimen is measured by focussing the scattered radiation onto a Si photovoltaic detector by means of a hemispherical mirror. The specimen is then replaced by a diffused reflectance standard and the measurement of the scattered power is repeated. The effective surface roughness is computed from the two scattered radiation measurements, the specular reflectance of the specimen, and the total reflectance of the standard. A control chart is established and maintained to monitor the stability of the measurement process over an extended period of time.

5. Significance and Use 5.1 The performance of optical components is affected by the degree to which these components scatter optical radiation.

5.2 The effective microroughness, $h_{rms}$, may be computed from the TIS.

5.3 This test method may be used in manufacture, quality control, and research.

7. Apparatus 7.1 Laser—He-Ne type, operating in the $TEM_{00}$ mode at wavelength 632.8 nm, having a beam diameter of 1 mm or less, a beam divergence of 5 mr or less and an output power of approximately 2 mW.

7.2 Detector—Silicon photovoltaic type having a dynamic range of $10^5$, with a sensitive area of 2 $mm^2$ or greater, and in a housing less than 10 mm in diameter. The detector shall be equipped with a diffuser or other means to minimize variation of signal with the position of the image on the detector with angle of incidence, and with polarization of the radiation.

7.3 Filters—Attenuation type to prevent detector saturation.

7.4 Mirror—Spherical type having a radius of curvature 10 cm or greater and having an aperture at the center that shall subtend an angle of 5° or less at the specimen. The outer diameter of the mirror shall allow for a collecting angle of 70° or greater relative to the specimen normal. The optical quality of the mirror shall be such that the irradiated portion of the specimen is imaged fully within the detector area.

7.5 Aperture Plate—Opaque type approximately 10 by 10 cm containing an aperture 3 mm in diameter and a target for schematic of aperture plate.

7.6 Optical Chopper, provided with a reference output signal.

7.7 Amplifier, Lock-In Type, equipped with a preamplifier with a range of gain settings appropriate for accommodating the range of signals originating from the detector. The amplifier-detector combination shall have a linear response within $\pm 10\%$ and reproducibility of $\pm 5\%$ over the required range of measurement.

7.8 Diffuse Reflectance Standard—A diffuse reflector of known total reflectance, 7.9 Polished Reflectance Standard—An optically polished metallic mirror to be maintained in a protected environment to prevent degradation of polish.

Having thereby described the subject matter of this invention it should be apparent that many substitutions, modifications and variations of the invention are possible in light of the above teachings. It is therefore to be understood that the invention as taught and described herein is only to be limited to the extent of the breadth and scope of the appended claims.

We claim:

1. A scanning scattering microscope apparatus for providing two dimensional micrographs of the overall surface microtopography of a specimen in response to the quantitative measurement of off-specularly reflected light wherein the apparatus comprises:

a light source unit comprising a conventional light source;

a focusing unit comprising a focusing lens for producing a micro focused beam of light from said light source;

a sample holding unit comprising a movable sample holding member wherein the sample holding member is designed to accommodate a specimen and is movable in the x, y, and z planes relative to the longitudinal axis of said focused beam of light which can scan the entire surface area of said specimen;

a light beam scanning unit which can scan the focused beam on a point by point basis in an X-Y direction over the specimen surface to obtain a high lateral resolution image of surface features;

a mirror unit comprising an apertured hemispherical mirror having an aperture hole formed therein at a location that is slightly offset relative to the center of the external periphery of the mirror; and, a detector unit comprising a conventional photodetector member which is mounted at a point which is symmetrically located with respect to the focal point of the focusing lens wherein the center of symmetry is the center of the hemispherical mirror; and, wherein the signal output of the photodetector member provides data that can be used to produce a quantitative measurement of off-specularly reflected light from the specimen to plot a two-dimensional micrograph of the surface microtopography of the specimen.

2. A method for producing two-dimensional micrographs of the overall surface microtopography of a specimen including the following steps:

(a) placing the specimen on a sample holding member that is movable in three mutually perpendicular x, y, and z directions;

(b) positioning the specimen proximate the center of a hemispherical mirror having an aperture hole disposed proximate to the periphery of the hemispherical mirror;

(c) positioning of a photodetector member in a symmetrical relationship with the specimen wherein the center of symmetry is the center of the hemispherical mirror;

(d) projecting a micro focused beam of light through the aperture hole on the hemispherical mirror to obtain a high lateral resolution image of surface features wherein the focused beam of light impinges on the specimen with specularly reflected light passing through the aperture hole and with virtually all of the non-specularly reflected light being sensed by the photodetector member;

(e) moving the sample holding member such that the surface of the specimen is scanned on a point by point basis.

3. The method of claim 2 further comprising the step of:

(f) using the output signals of the photodetector to produce data that can be plotted to produce a two-dimensional micrograph of the overall surface microtopography of a particular specimen.

4. The method of claim 2 wherein the following step is substituted for step e:

(g) moving the light beam such that the surface of the specimen is scanned on a point by point basis.

* * * * *